(12) United States Patent
Reuter

(10) Patent No.: US 7,337,095 B2
(45) Date of Patent: Feb. 26, 2008

(54) METHOD FOR PLANNING AND/OR CONFIGURING A PROJECT

(75) Inventor: Thomas Reuter, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 152 days.

(21) Appl. No.: 10/924,925

(22) Filed: Aug. 25, 2004

(65) Prior Publication Data

US 2005/0085936 A1    Apr. 21, 2005

Related U.S. Application Data

(63) Continuation of application No. PCT/DE03/00610, filed on Feb. 25, 2003.

(30) Foreign Application Priority Data

Feb. 25, 2002 (DE) .................................. 102 07 831

(51) Int. Cl.
*G06F 17/50* (2006.01)
*G06F 9/44* (2006.01)

(52) U.S. Cl. .......................................... 703/1; 717/101
(58) Field of Classification Search .................. 703/1, 703/23–26; 700/99–102; 705/8, 9; 717/101
See application file for complete search history.

(56) References Cited

U.S. PATENT DOCUMENTS 5,980,078 A * 11/1999 Krivoshein et al. .......... 700/1

| | | | |
|---|---|---|---|
| 6,263,487 B1 | 7/2001 | Stripf et al. | |
| 6,298,319 B1 | 10/2001 | Heile et al. | |
| 6,731,596 B1 * | 5/2004 | Chiang et al. | 370/217 |
| 7,020,697 B1 * | 3/2006 | Goodman et al. | 709/223 |

OTHER PUBLICATIONS

"Simatic Prozessleitsystem Simatic PCS 7", Katalog ST PCS 7—2001, Apr. 2001, pp. 1-30, Siemens AG.

* cited by examiner

*Primary Examiner*—Zoila Cabrera
*Assistant Examiner*—Eunhee Kim
(74) *Attorney, Agent, or Firm*—Sughrue Mion, PLLC

(57) ABSTRACT

A method for at least one of planning and configuring a project, which represents an automation device (4) for controlling a technical installation. The project data required for the at least one of planning and configuring the automation device (4) can be stored in an engineering system (2). The at least one of planning and configuring of the project is simplified by subdividing the project into a number of partial projects (Tp1, . . . ). The partial projects (Tp1, . . . ) are at least one of planned and configured on different programming units (13, . . . ) that are interconnected. Data records (18a, . . . ) are centrally stored that indicate which partial projects (Tp1, . . . ) are actively connected to which programming units (13, . . . ). These data records (18a, . . . ) can be read out by the programming units (13, . . . ).

23 Claims, 2 Drawing Sheets

1. Process Control System
2. Engineering System
3. Control and Monitoring System
4. Automation Device
5. Bus System
6-9. Automation Devices
10. Bus System

METHOD FOR PLANNING AND/OR CONFIGURING A PROJECT

This is a Continuation of International Application PCT/DE03/00610, with an international filing date of Feb. 25, 2003, which was published under PCT Article 21(2) in German, and the disclosure of which is incorporated into this application by reference.

FIELD AND BACKGROUND OF THE INVENTION

The invention relates to a method for planning and/or configuring a project, which includes an automation device to control a technical installation. The project data required for planning and/or configuring the installation is stored in an engineering system. The invention further relates to an engineering system for planning and/or configuring a project.

Such a method is known in the related art from Siemens catalog ST PCS 7, chapter 1, issue 2001. A process control system for controlling a technical installation has an engineering system, which is provided, in particular, to configure hardware and/or software components, to design communication networks, to design continuous and sequential process flows, to design control and monitoring strategies, and to prepare recipes for batch processes. The required project data for planning and/or configuring a project, which represents the automation device to be designed, can be stored, for example, in a memory of a programming unit or a server. The programming units involved in the planning and/or configuration in a multi-user operation can access this common memory. Because the project data are centrally stored, they can be very voluminous depending on the complexity of the automation device. Furthermore, during planning in a so-called multi-user operation, particularly if many designers simultaneously compete for access to the centrally stored project data via the network, substantial performance problems and long response times may occur. Today, the designer is therefore often forced to copy parts of the project data from the total project data to his own programming unit, to plan decentrally without the context of the total project, and then to reintegrate these parts into the total project. These planning steps are prone to errors, and the handling of the data and subsequent correction of the total project data is labor intensive. Furthermore, matching the engineering data of the automation systems, the control and monitoring systems, and the batch systems can only be done in the context of the total project data. This matching is usually very time consuming and involves a project-wide interruption of the planning work.

OBJECTS OF THE INVENTION

One object of the present invention is to simplify a method for planning and/or configuring a project. A further object of the invention is to provide an engineering system that improves the planning and/or configuration of a project.

SUMMARY OF THE INVENTION

The objects of the invention are attained according to one formulation of the invention by a method for at least one of planning and configuring a project, which represents an automation device for controlling a technical installation, wherein project data required for the at least one planning and configuring the automation device can be stored in an engineering system. The method comprises:

dividing the project into a plurality of partial projects;

at least one of planning and configuring the partial projects on a plurality of programming units that can be differently interconnected, wherein project data of one of the partial projects is stored in at least one of the programming units on which the partial project was at least one of planned and configured; and centrally storing data records, which indicate which of the partial projects are operatively linked to which of the programming units, wherein these data records can be read by the programming units, and wherein the project data of the partial projects of the operatively linked programming units can be directly transferred between the programming units.

The objects are attained, according to another formulation, by a management unit operable to perform features of the aforementioned method.

It is advantageous that the project data themselves are not centrally stored but only the data records that indicate to the programming units which partial project data are stored on which programming units. As a result, the project data can be handled more easily. If, for example, a programming unit requires partial project data of another programming unit, this programming unit accesses the data of the other programming unit directly.

Due to the distribution and thus, decentralization of the project data, in contrast to the central data management as practiced in the related art, performance during simultaneous planning in a multi-user operation is dramatically improved because a large part of the data relevant for local planning is also stored on the local programming unit of the corresponding user. The relevant and locally stored project data can thus be accessed very quickly, without multi-user conflicts, without bottlenecks in the computer network and without losing access to the total project data. As a result, the performance in the multi-user operation is usually almost identical to the performance in a single user operation. Furthermore, the integration of partial project data in the total project is no longer required. Data matching and consistency or plausibility checks of the data of the programming units involved in the total project can be done directly via the network. The time required to match the data of the programming units involved in the project is thereby also reduced significantly. Furthermore, the decentralized project data management simplifies error handling. Any errors that occur in the planning and/or configuration phase do not "jeopardize" the data of the total project but only partial project data. Such errors are easy to locate and are analyzed and corrected by the programming unit that is handling the partial project containing the errors. In addition, decentralized project data management makes it easy to handle new versions of partial project data, which can be easily integrated into the total project.

Another embodiment of the invention provides a means to indicate whether the project data of the corresponding programming unit can be accessed. As a result, a designer can see on his programming unit which programming units are currently connected to the engineering system. This means that the designer can see which project data of other programming units can be accessed at that moment.

Other exemplary embodiments of the invention are as set forth in the claims.

BRIEF DESCRIPTION OF THE DRAWINGS

The invention and supplements and refinements thereof will now be described and explained in greater detail with reference to embodiments depicted in the drawings, in which.

DETAILED DESCRIPTION OF THE EXEMPLARY EMBODIMENTS

Figure 2:
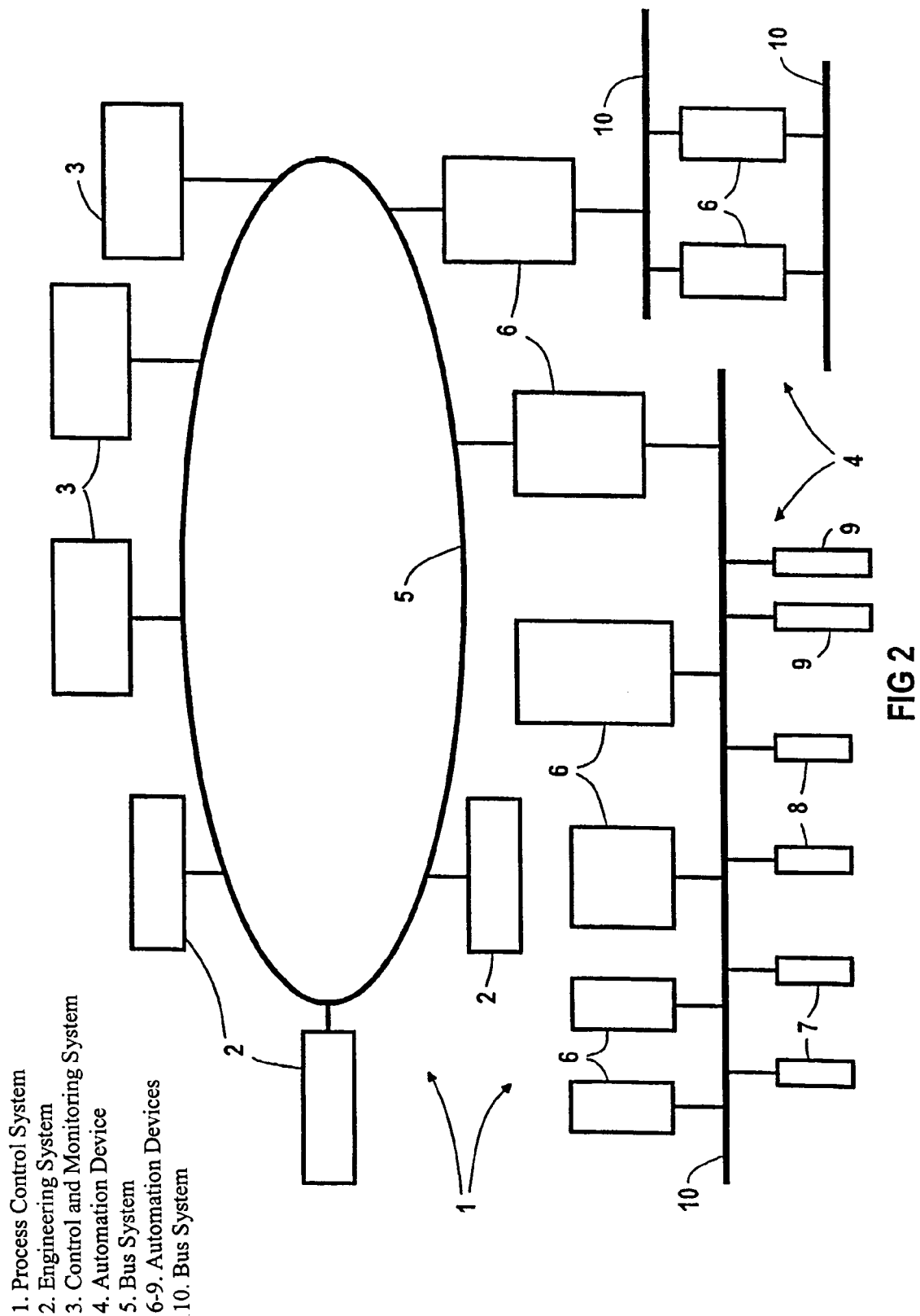
FIG. 2 shows a process control system according to an exemplary embodiment of the invention.

Reference is first made to FIG. 2, which shows a process control system 1. The process control system 1 has an engineering system 2, a control and monitoring system 3, and a planned and configured automation device 4. The engineering system 2 is provided for planning and/or configuring the automation device 4. The automation device 4, which is connected to the engineering system 2 and the control and monitoring system 3 by a bus system 5 and bus connections (not depicted), includes various automation devices 6, actuators 7, sensors 8 and other automation components 9 required to control a technical installation.

The automation devices 6, which are interconnected by the bus system 5 and/or other suitable bus systems 10, can have different configurations. For example, ordinary automation devices for solving small, medium-sized and larger automation tasks are provided within the automation device 4. As a non-limiting example, programmable micro-controllers can be used to solve small automation tasks, small programmable controllers to solve medium-sized automation tasks and powerful programmable controllers to solve more complex automation tasks.

The hardware and software components, i.e., the automation devices, control and monitoring devices, bus systems, actuators, sensors and control programs, which are to equip the automation device 4, depend on the complexity of the technical installation to be controlled and on the control task. The required hardware and software components of the automation device 4 can be planned and/or configured by the engineering system 2.

Figure 1:
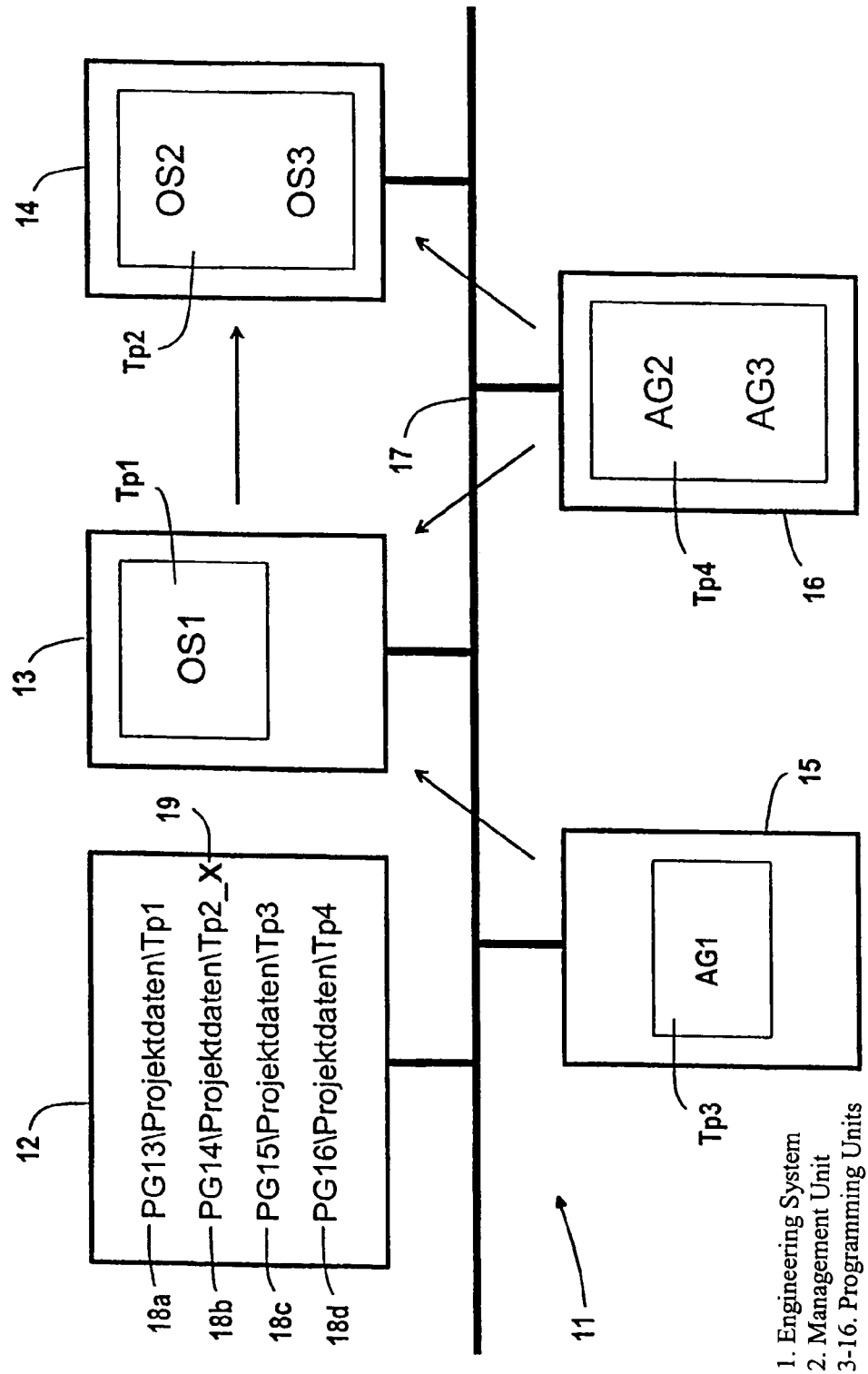
FIG. 1 shows an engineering system according to an exemplary embodiment of the invention.

Reference is now made to FIG. 1, which shows an engineering system 11 for planning and/or configuring hardware and software components of an automation device. For this purpose, the engineering system 11 in the present invention has a management unit 12 and four programming units 13, 14, 15, 16. The management unit 12 and the programming units 13, 14, 15, 16 are interconnected by a bus system 17. The management unit 12, which can of course form part of a programming unit 13 to 16, divides a project, which represents the automation device and contains information on the required hardware and software components as a function of the automation task to be solved, into four partial projects Tp1, Tp2, Tp3, Tp4. The partial project Tp1 is to be processed by the programming unit 13, the partial project Tp2 by the programming unit 14 and, correspondingly, the partial project Tp3 by the programming unit 15 and the partial project Tp4 by the programming unit 16. For this purpose, all the hardware and software components of the automation device required for the planning and/or configuration can be represented virtually on the display units of the programming units 13 to 16.

For example, the views of the equipment of the automation devices, the control and monitoring systems and other hardware components, such as, for example, input and output modules, field devices, bus systems and views of software modules to create control programs for the automation devices, can be displayed on the display units. The partial project Tp1 includes the planning of a control and monitoring station OS1, the partial project Tp2 the planning of control and monitoring stations OS2, OS3, the partial project Tp3 the planning of an automation device AG1 and the partial project Tp4 the planning of automation devices AG2, AG3. The partial projects Tp1 and Tp3, the partial projects Tp1 and Tp2 and the partial projects Tp2 and Tp4 are operatively linked, which is indicated by arrows in FIG. 1. For example, the partial projects Tp2 and Tp4 are operatively linked in such a way that batch data of the automation devices AG2, AG3 must be exported to the control and monitoring stations OS2, OS3, or that connection data must be transferred between the automation device AG1 and the control and monitoring station OS1. In a memory (not depicted) of the management unit 12, the management unit 12 stores data records 18a, 18b, 18c, 18d, which tell the programming units 13, . . . 16 which partial projects Tp1, Tp2, Tp3, Tp4 are operatively linked with which programming units 13, . . . 16. In the present example, the data record 18a indicates to the programming units 13, . . . 16 that partial project data of the partial project Tp1 are stored in the programming unit 13 and that this partial project Tp1 is being processed by this programming unit 13. Correspondingly, the data record 18b indicates that partial project data of the partial project Tp2 are stored in the programming unit 14; furthermore, the data record 18c indicates that partial project data of the partial project Tp3 are stored in the programming unit 15 and the data record 18d indicates that partial project data of the partial project Tp4 are stored in the programming unit 16 and that the partial projects Tp2, Tp3, Tp4 are being processed by the corresponding programming units 14, 15, 16.

If the programming unit 13, which is processing the partial project Tp1, requires project data of the partial project Tp4, the programming unit 13 first performs a read access to the management unit 12 and detects, based on the data record 18d, that the partial project Tp4 is being processed by the programming unit 16. This information is used in such a way that the programming unit 13 accesses the programming unit 16 directly to read out the required project data of the partial project Tp4. This means that the data are transferred directly between the programming units 13 and 16.

It is possible, for example, that the programming unit 16 requires project data of the partial project Tp2, which is being processed by the programming unit 14, but the programming unit 14 is not currently connected to the bus 17. In this case, the management unit 12 indicates to the programming unit 16 that the project data of the programming unit 14 cannot currently be accessed. For this purpose, the management unit 12 assigns an identifier 19 to the data record 18b, which indicates to the programming units 13, 15 and 16 that the programming unit 14 is not currently connected to the bus 17 and, as a result, the project data of the partial project Tp2 cannot be accessed. If the programming unit 14 is subsequently connected to the bus, the programming unit 14 logs onto the management unit 12, which then cancels the identifier 19. As a result, the programming units 13, 15 and 16 are made aware that the project data of the partial project Tp2 can now be accessed.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for at least one of planning and configuring a project, which represents an automation device for controlling a technical installation, wherein project data required for at least one of planning and configuring the automation device is stored in an engineering system, the method comprising:

dividing the project into a plurality of partial projects;

at least one of planning and configuring the partial projects on a plurality of programming units that are interconnected, wherein project data of one of the partial projects is stored in at least one of the programming units on which the partial project was at least one of planned and configured;

centrally storing data records, which indicate which of the partial projects are operatively linked to which of the programming units; and determining whether the project data of an associated programming unit can be accessed, wherein:

these data records are read by the programming units; and the project data of the partial projects of the operatively linked programming units is directly transferred between the programming units, wherein the partial projects are not centrally stored but are only stored in the programming units.

2. The method as claimed in claim 1, wherein the project data of the one of the partial projects is stored solely on one of the programming units.

3. The method as claimed in claim 1, wherein an identifier is read to determine whether the project data of the associated programming unit can be accessed.

4. The method as claimed in claim 3, wherein the identifier indicates whether the associated programming unit is interconnected at the time of determining whether the project data of the associated programming unit can be accessed.

5. The method as claimed in claim 1, wherein said determining whether the project data of an associated programming unit can be accessed comprises determining if the associated programming unit is connected to the engineering system and when the associated programming unit is connected to the engineering system, the project data of the associated programming unit can be accessed.

6. The method according to claim 5, wherein said centrally stored data records indicate for each partial project which programming unit stores the respective partial project, and wherein the partial projects are not centrally stored but are only stored in the programming units.

7. The method according to claim 1, further comprising assigning an identifier to a data record corresponding to a partial project stored in a programming unit when the programming unit disconnects.

8. The method according to claim 7, wherein the assigned identifier is deleted from the data record when the programming unit connects to the engineering system.

9. The method as claimed in claim 1, wherein said automation device for controlling the technical installation comprises a process control system, wherein the process control system controls the technical installation.

10. The method as claimed in claim 1, wherein said automation device for controlling a technical installation comprises a process control system, wherein the process control system monitors a manufacturing environment and controls the process or manufacturing flow based on limits set by the user.

11. The method as claimed in claim 1, wherein said determining of whether the project data of the associated programming unit can be accessed is based on availability of the programming unit for direct exchange of the project data.

12. The method as claimed in claim 11, wherein a first programming unit of the said programming units stores project data of a first partial project and wherein each of other programming units that need to access the project data of the first partial project access the first partial project data at substantially same time.

13. The method as claimed in claim 11, wherein at least two of the programming units access a project data of a partial project at substantially same time.

14. The method as claimed in claim 1, wherein the engineering system comprises the programming units and a data management unit that centrally stores the data records.

15. An engineering system for at least one of planning and configuring a project, which includes an automation device of a technical installation to be controlled, wherein project data required for at least one of planning and configuring the automation device is stored in the engineering system, the engineering system comprising:

a management unit by which the project can be divided into a plurality of partial projects that can be at least one of planned and configured on different programming units that are interconnected, wherein project data of one of the partial projects is stored in at least one of the programming units on which the partial project was at least one of planned and configured, the management unit creating and centrally storing data records, which indicate which of the partial projects are operatively linked to which of the programming units, wherein these data records are read by the programming units, wherein the project data of the partial projects of the operatively linked programming units is directly transferred between the programming units, and wherein the management unit has means to indicate whether the project data of a respective programming unit can be accessed, wherein the partial projects are not centrally stored but are only stored in the programming units.

16. The engineering system as claimed in claim 15, wherein the project data of the one of the partial projects is stored solely on one of the programming units.

17. The engineering system as claimed in claim 15, wherein the management means comprise a programmable controller including an identifier that indicates whether the respective programming unit is interconnected to a network.

18. The engineering system as claimed in claim 15, wherein one of the programming units operates as the management unit.

19. The engineering system as claimed in claim 15, wherein the programming units are interconnected via a global network.

20. The engineering system according to claim 15, further comprising a bus interconnecting the management unit and the different programming units, and wherein the management unit assigns an identifier to a data record corresponding to a partial project stored in a programming unit that disconnects from the bus and wherein, when the programming unit connects to the bus, the management unit deletes the identifier from the data record, and wherein the identifier indicates whether the data record can be accessed, and wherein the partial project is stored only in the respective programming unit and not stored centrally.

21. The engineering system as claimed in claim 15, wherein the engineering system further comprises the programming units and wherein the data management unit centrally stores records indicating in which of the programming units, each partial project is stored.

22. A computer-readable medium including a program comprising instructions which, when executed, cause an engineering system to:

divide a project into a plurality of partial projects;

at least one of plan and configure the partial projects on a plurality of programming units that are interconnected, wherein project data of one of the partial projects is stored in at least one of the programming units on which the partial project was at least one of planned and configured; and centrally store data records, which indicate which of the partial projects are operatively linked to which of the programming units, wherein these data records are read by the programming units, and wherein the project data of the partial projects of the operatively linked programming units is directly transferred between the programming units, and wherein the partial projects are not centrally stored but are only stored in the programming units.

23. The computer-readable medium as claimed in claim 22, wherein the project data of the one of the partial projects is stored solely on one of the programming units.

* * * * *